United States Patent [19]
Land

[11] 3,709,588
[45] Jan. 9, 1973

[54] MOTION PICTURE SYSTEM WITH UNIQUE PROJECTOR AND METHOD

[75] Inventor: Edwin H. Land, Cambridge, Mass.

[73] Assignee: Polaroid Corporation, Cambridge, Mass.

[22] Filed: May 24, 1971

[21] Appl. No.: 146,025

Related U.S. Application Data

[62] Division of Ser. No. 755,901, Aug. 28, 1968, Pat. No. 3,615,127.

[52] U.S. Cl. ..................352/78 R, 352/130, 95/89 R
[51] Int. Cl. ............................................G03b 23/02
[58] Field of Search .........352/72, 78, 130; 95/13, 89

[56] References Cited

UNITED STATES PATENTS

| | | | |
|---|---|---|---|
| 3,181,444 | 5/1965 | Takats et al. | 95/12 |
| 3,410,498 | 11/1968 | Winkler et al. | 352/78 R X |
| 3,383,998 | 5/1968 | Takats | 95/90.5 |
| 3,097,584 | 7/1963 | Wright | 95/12 |
| 3,041,952 | 7/1962 | Schreck | 95/14 |

Primary Examiner—John M. Horan
Assistant Examiner—Alan A. Mathews
Attorney—Brown & Mikulka, William D. Roberson and Robert L. Berger

[57] ABSTRACT

A motion picture system and method including a unique compact multipurpose film handling cassette-projector arrangement. The cassette is initially furnished with unexposed film and includes an arrangement for exposing, processing, drying and projecting that film in cooperation with externally mounted features of a camera and projector. After the film has been exposed with the cassette mounted in the camera, it is mounted in the projector which has cooperating features for effecting the processing, drying and projection of the film strip.

11 Claims, 4 Drawing Figures

INVENTOR.
Edwin H. Land

BY Brown and Mikulka
and
William D. Roberson
ATTORNEYS

MOTION PICTURE SYSTEM WITH UNIQUE PROJECTOR AND METHOD

This is a division of application, Ser. No. 755,901 filed Aug. 28, 1968 now U.S. Pat. No. 3,615,127.

BACKGROUND OF THE INVENTION

This invention is directed to a system having as a principal purpose the simplification of the techniques of exposing, developing and projecting motion pictures. In the recent history of cinematography certain simplifications have been made in some of the processes of obtaining or of viewing motion pictures. For example, cassette systems have been offered by which the single act of the exposure of cinematographic films is accomplished through the use of a simple cassette easily loaded into motion picture cameras for exposure therein. Although motion picture camera cassettes have simplified the process of loading and removing of film from a camera, they have not simplified the subsequent stages of development or viewing of the film. Exposure of the film, is, of course, only the first step in obtaining a visible image for viewing purposes. Typically, exposed cinematographic films are sent to film developing laboratories frequently great distances from the user and are returned subsequently by mail or otherwise in a completely different container from that in which the film was originally exposed. The developed film, returned to the user days or even weeks after its exposure, is typically threaded into and through a projector mechanism and run between reels which are generally unconnected with each other except through the projector mechanism.

In recent years, some projector cassettes have found their way into usage. These typically store large quantities of film previously exposed and developed in different supply systems. Projection cassettes often are constituted by large pieces of apparatus containing film laboriously edited and assembled from a number of film strips. Accessibility to individual portions of films in such projector cassettes has not been particularly satisfactory or easy to accomplish.

What the motion picture arts have lacked is a compact multipurpose cassette system capable of use not only in the camera but also in the projector and in which film processing operations may be carried out to make the images recorded on the film instantly accessible and capable of being edited simply by the selection and sequential projection of film contained in serially arranged cassettes.

SUMMARY OF THE INVENTION

This invention concerns a motion picture system wherein use is made of a compact multipurpose film cassette within which the several operations of exposure, chemical processing, drying and projection of the recorded images may be accomplished without once transferring the film from the cassette to any other container or even removing the film from the original cassette. This system provides instant access to the motion picture film strip at any stage in its use including not only the initial exposure of the film but also the final projection of images recorded on the film. A preferred embodiment of the cassette comprises coplanar supply and take-up reels to which opposite ends of the film strip are permanently attached. The unexposed photosensitive film strip initially wound upon the supply reel, preferably passes from the supply reel through a film drying station through which a drying current of air may be pumped between input and output ports. The drying station, however, is of principle utility not in the exposure stage, but in a stage subsequent to the development of the film. After passing through the drying station the unexposed film passes through a film gate for exposure to image bearing light. Beyond the exposure station the film is wound onto a take-up reel in the customary manner.

When substantially the entire length of the photosensitive film strip in the cassette has been exposed and has been wound onto the take-up reel, the cassette is then loaded into a special-purpose projector in which the motion of the film is reversed, this time passing from the take-up reel onto the supply reel. In its movement in the reverse direction, the film strip is subjected to a processing treatment. In this treatment a viscous processing fluid is applied to exposed portions of the film strip by means including a doctor blade. The doctor blade itself is supplied with a limited amount of viscous development fluid which soaks into the emulsion on the photosensitive film to effect the development of the latent photographic image and to transfer it by diffusion to an image-receptive stratum. A negative emulsion is used which, after development possesses low covering power and which therefore need not subsequently be removed from the film strip. Partly because of the subsequent passage of the film strip through the drying chamber on its return to the supply reel, a skin is formed on the processed photographic emulsion, thus providing a dry surface which prevents the convolutions of the film strip from adhering to themselves as they are would upon the supply reel. The rewinding of the film onto the supply reel is preferably accomplished rapidly just before projection of the film.

After the film has been processed and rewound in a partly dried condition, it is then returned at a slower projection pace, this time being completely dried as it passes through the drying station on its way to the film gate. A specially important feature of the invention resides in the fact that a prism is mounted behind the film at the film gate. The prism is adapted to admit light directed through it by a condenser system in the projector. The projection light is directed into the side of the cassette and reflected by the prism through the film and outwardly through projection optics included in the projector. This prism, mounted as a permanent part of the cassette, simplifies the optics and the mechanical features of the projector adapted to accept the cassette. The prism is also responsible for maintaining the effective aperture of the projection optics within a limited space whereas a mirror-type reflector would significantly reduce the effective aperture within the same space. It also permits the cassette to be introduced simply into a projector without the necessity of introducing optical portions of the projector into the cassette structure or of pulling the film from the cassette to thread it through a projector station.

The multipurpose cassette thus contains stations for the initial exposure of the film, the subsequent processing and drying of the film and finally for the projection of the images recorded on the film. All of these functions are provided in a compact relatively flat cassette of modular construction.

Thus it is among the objects of this invention to provide a motion picture system employing a compact motion picture film cassette useful for the exposure, for the processing and for the projection or viewing of the film contained therein, and from which cassette the photographic film need never be removed from the time it is first loaded in its photosensitive state to the time its fully developed images are projected onto a screen or otherwise presented for viewing purposes.

BRIEF DESCRIPTION OF THE DRAWINGS

These and other objects of the invention may be seen more fully in connection with the following detailed description taken together with the accompanying drawings wherein.

DETAILED DESCRIPTION

Figure 1:
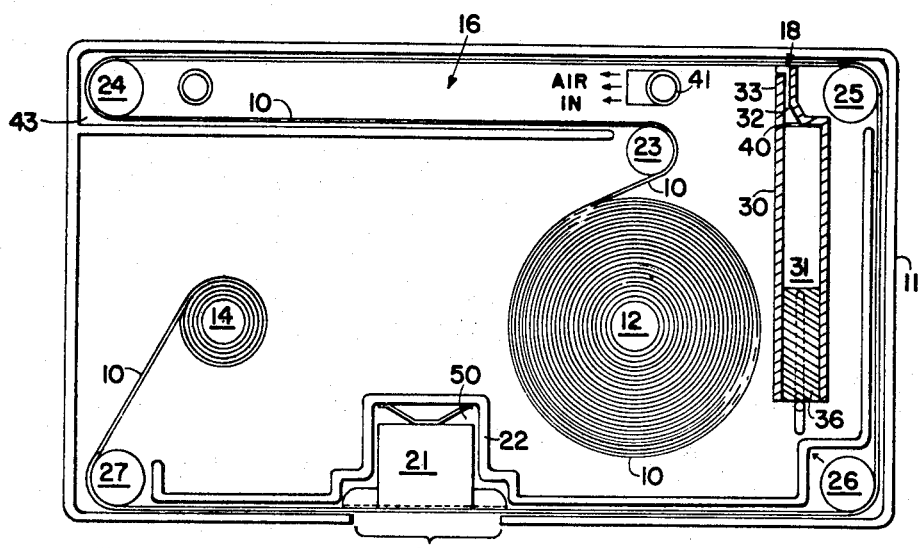
FIG. 1 is a plan view of the interior of a multipurpose motion picture film cassette constructed in accordance with this invention.

The currently preferred embodiment of this invention makes use of a film assembly which comprises both a photosensitive negative emulsion and an image-receiving layer to which a positive image may be transferred by diffusion during development without the necessity thereafter of removing the emulsion containing its developed negative image. This is possible if the developed negative image has low covering power.

In typical silver transfer-reversal processes for the production of black-and-white images, a silver halide developer and a silver halide solvent are applied in an aqueous alkaline solution to a photoexposed silver halide stratum or emulsion, where they develop exposed silver halide to silver and react with unreduced silver halide to form a soluble silver complex. This complex, in order to form a positive print, is transferred and reduced to silver on a silver-receptive stratum upon which the silver halide stratum has been superposed. It has generally been the practice, in the completion of this process, to separate the silver-receptive and silver halide strata in order to render the positive print visible.

The positive print may, however, by rendered visible without the separation of the silver halide and silver-receptive strata. For example, the silver-receptive stratum may be so constituted as to provide an unusually predeterminedly vigorous silver precipitating environment which causes the silver deposited upon it, in comparison with silver developed in the silver halide stratum, to possess very high covering power, that is, opacity per given mass of reduced silver. If the silver halide is in such a concentration as to give rise only, when fully developed, to a predeterminedly low maximum density, and if the silver complex is reduced to silver in a vigorous silver precipitating environment, the resulting negative and positive prints in superposition provide a composite print that presents a good image for projection purposes as long as they are contained on a transparent support. Because the silver halide stratum and the silver-receptive stratum need not be separated, an overall simplification of the silver transfer-reversal process is achieved.

A composite film assembly of this type as well as processing compositions for producing a fully developed black-and-white image without the necessity of removing the developed negative image after processing are shown in my prior U.S. Pat. No. 2,861,885 which issued Nov. 25, 1958. Other composite film assemblies capable of producing developed full-color images without the necessity of removing the developed emulsion are shown in my prior U.S. Pats. Nos. 2,726,154, issued Dec. 6, 1955, and 2,944,894, issued July 12, 1960. The present invention is not directed to the chemistry by which images are developed in the photosensitive emulsion and transferred to an image-receiving stratum. However, in the practice of this invention, whether the film employed is black-and-white film or color film, it is preferably of a type not requiring the removal of the negative emulsion after it is developed.

Figure 2:
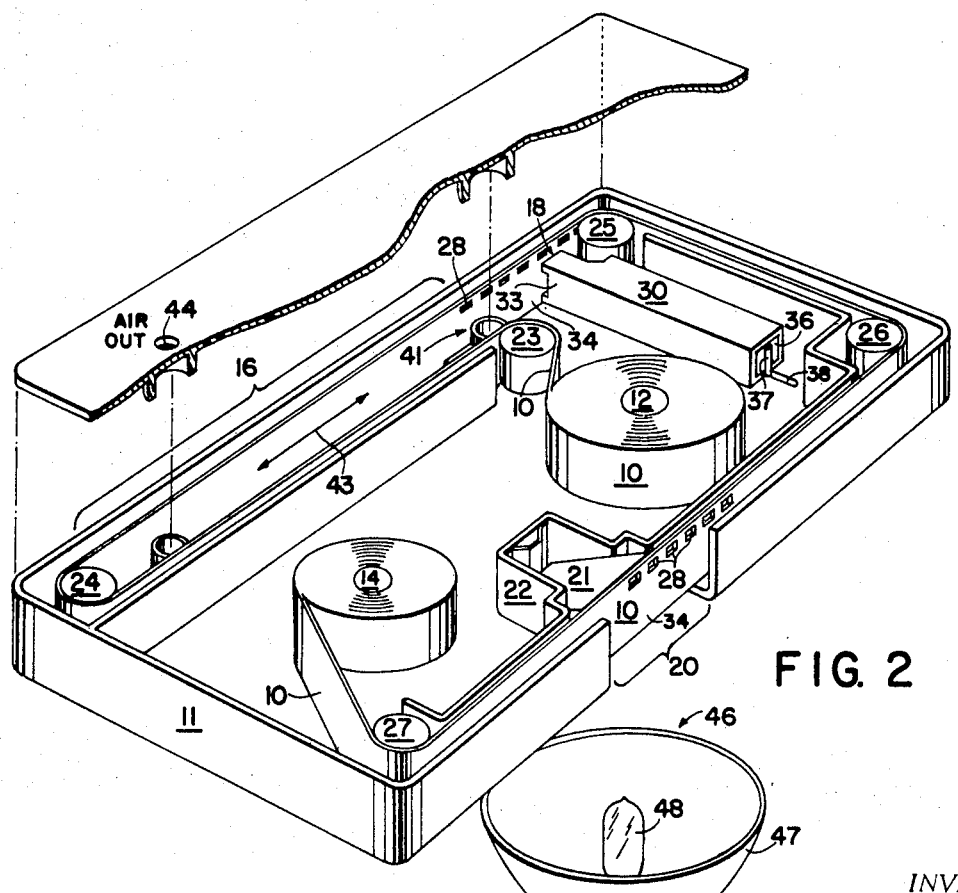
FIG. 2 is a perspective view of the cassette showing the relationship of the cassette to a projection light source and with the cover separated therefrom and broken away to reveal some of its functions.

In the plan view of the cassette assembly shown in FIG. 1 as well as in the perspective view of FIG. 2 such a film strip 10 is shown incorporated within an opaque light-tight housing 11. Initially most of the film in its photosensitive state is coiled on and permanently attached to one end of a rotatable supply reel 12, the film being wound thereon with the emulsion side facing inward and the transparent film base outward. The opposite end of the film strip is also permanently attached to a rotatable take-up reel 14. In its somewhat circuitous path of transportation from the supply reel 12 to the take-up reel 14 the film passes several functional stations utilized at different periods in the life cycle of the cassette. The order of the passage of film through these several stations is not, however, the same as the sequence with which the stations are brought into operation. From the supply reel 12 the film strip 10 passes first through a film drying station 16. The film strip then passes through a film development station 18 and thereafter through a film gate area 20 with a built-in prism 21 mounted behind the film strip. The film gate 20 functions at different times as an exposure station and as a projection station. Baffles 22 behind the film gate area and the prism 21 prevent light from penetrating the interior of the cassette.

The first use of the cassette is for exposure of the photosensitive film contained therein in a photographic camera. In this usage the film gate 20 is an exposure station through which images are directed by a camera lens and through a camera shutter onto the photosensitive film in its passage from the supply reel to the take-up reel. During the exposure sequence the film drying station 16 and the film development station 18 are passive. The film 10 passes around an initial pulley 23 and subsequently in sequence around four additional pulleys 24, 25, 26, and 27 located respectively in the four corners of the cassette. The film is drawn onto the take-up reel 14 by power supplied thereto in the camera. Simultaneously, it is advanced past the exposure station 20 in increments by a typical claw mechanism or the like cooperating with the sprocket holes 28 provided adjacent one edge of the film strip. In the embodiment illustrated, the photosensitive surface of the film strip faces inward such that exposure of the emulsion is effected through the transparent film base.

Pulley 26, around which the film strip passes on its way to the film gate, may if desired be mounted on a movable post spring biased toward the corner which it occupies in the cassette housing and capable of being moved resiliently inward away from the corner. Concurrently, pulley 27 may be designed in accordance with current practice to provide a snubbing action. This represents one way to minimize strain on the film strip by the intermittent film advancement structure engaging the sprocket holes 28 of the film.

In its first use in the camera, the combination cassette assembly functions similar to other camera cassettes. After the entire length of film has been exposed to image-bearing light, substantially the entire length of the film will then have been coiled onto the take-up reel 14 and unwound from the supply reel 12.

Figure 4:
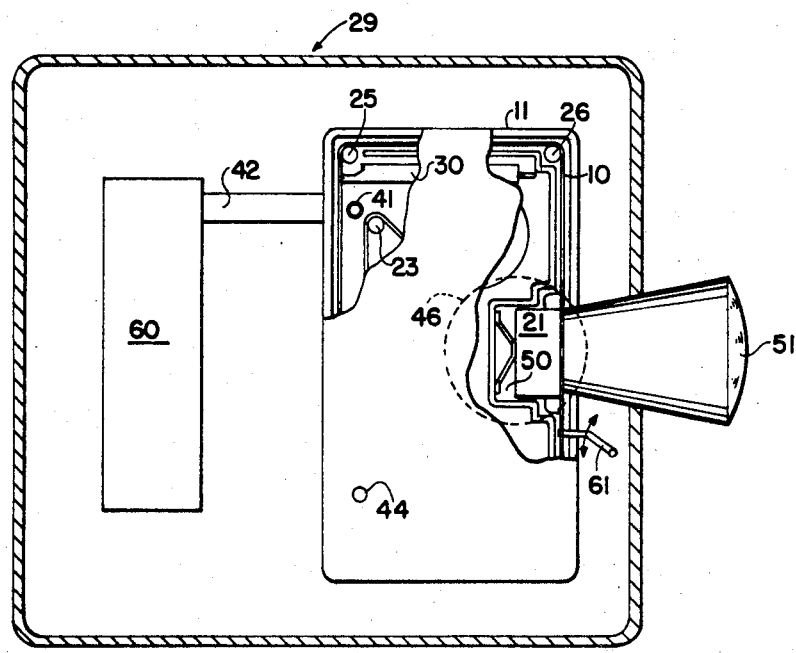
FIG. 4 is a plan view, partly in perspective of a projector constructed in accordance with this invention showing in cooperative relationship therewith the cassette illustrated in the previous drawings.

The next stage of operation, the film processing stage, may be accomplished in the same camera in which the film was exposed but is preferably accomplished in a projector 29 such as that shown in FIG. 4. The film is processed during a rapid rewind of the exposed film from the take-up reel 14 to the supply reel 12. Processing is accomplished in part by means of a container 30 having therein a supply of viscous developing fluid 31. One end of the container 30 comprises an orifice 32 which acts as a nozzle feeding a doctor blade 33 to supply a carefully measured thickness of the viscous film processing fluid 31 to only that width of the photosensitive film strip surface on which images have previously been recorded. The doctor blade 33 is spaced a carefully predetermined distance from the surface of the film strip to express a metered thickness of viscous developer onto the photosensitive surface of the film.

As best seen in FIG. 2, the doctor blade 33 extends across only part of the total width of the film, i.e., that intermediate portion of the film strip width on which the latent images are recorded. In this way no film processing composition is applied to the area of the film occupied by the sprocket holes 28 or to the opposite edge area 34 of the film. The edges of the film may, therefore, be employed as dry bearing faces in the subsequent passage of the film around pulley 24 on its way back to the supply reel 12. Additionally, edge area 34 may carry a magnetic strip for use as a sound track.

The amount of processing composition required to be held in container 30 is not large. One reason for this is that the developing composition is applied sparingly to only those portions of the film requiring chemical treatment after exposure. Additionally, it is not necessary to supply a thick layer of processing composition to provide adequate development of the negative and the transfer by diffusion of the positive image onto the image-receiving stratum of the film strip. No more than 3 cc. of viscous developing reagent is necessary to treat an image-bearing area approximately 5.4 mm. wide. If the initial thickness of the photosensitive film strip is approximately 0.076 mm., after treatment and drying the strip may increase in thickness only to about 0.081 mm. on a film strip 15 meters in length. By the use of a viscous developing reagent and by the economical distribution of the viscous reagents on the surface of the film by a doctor blade, a great economy of materials may be effected. Thus it is possible to provide a very compact multipurpose motion picture film cassette with an included processing station.

During the processing of the film on its return trip to the supply reel 12, the viscous development composition 31 should be expressed from the orifice 32 behind the doctor blade 33 with sufficient pressure to insure its adherence to the surface of the film. One way this may be accomplished is by means of a plunger 36 which is movable pistonlike within the container 30. The plunger may be biased in the direction of the orifice 32 by a plunger driver 37 projecting inward through a slot 38 in the wall of the cassette. Before the plunger driver 37 is brought to bear against the plunger 36, the processing fluid 31 gay be prevented from leaking out to the orifice 32 by a rupturable membrane 40 which is capable of being broken by the application of a sufficient initial force. The plunger driver cooperates with and may even be a part of the projector mechanism nd is brought into action by the projector during the time that the film is being rewound onto supply reel. The plunger driver may, however, be provided as an integral part of the cassette structure mounted for sliding movement between guides in the wall of the cassette and extending through the wall for engagement with an appropriate operator member in the projector. However the plunger driver 37 is mounted, its entry through the wall of the cassette should be baffled to prevent fogging of the film by light leaks prior to development.

As the viscous reagent is being expressed to the sensitive surface of the exposed film strip, the film may be wound with almost surprising speed onto the original supply reel 12 without causing any adhesions between the overlapping convolutions of the film strip. The entire length of 15 meters of film may be processed and coiled upon the supply reel in as short a period of time as 30 seconds. For rewinding purposes, it is not necessary for the film strip be completely dry as long as the surface of the wetted film strip is sufficiently dry to provide a skin or protective layer over the still damp emulsion beneath. To assist in the formation of this initial protective skin, the film is preferably passed through the drying station 16 which is preferably rendered functional at this stage.

With the film cassette positioned in the projector as shown in FIG. 4, connections are made between the light-baffled orifice 41 and a duct 42 delivering forced air for drying purposes. Air pumped through the orifice 41 passes through an elongated drying chamber 43 and out through one or more output ports 44 at the opposite end of chamber 43. It is to be noted that in the embodiment shown the film strip passes first along one side of the drying chamber 43 and then back along the other side, exposing its treated surface thus twice to the drying influence of the air passing through this chamber. This doubles the effective length of the chamber. Complete drying of the film is, nevertheless, not accomplished in the space of 30 seconds total rewind time. The complete drying is left to the next stage during which the film is once again advanced from the supply reel to the take-up reel at the more leisurely rate used in the projection of the film strip.

During the projection of the fully developed film strip 10, unique and effective use is made of the prism 21 behind the film strip at the film gate 20. Prism 21 collects light from a light source 46 indicated by the dotted lines in FIG. 4 as being on the opposite side of the cassette. FIG. 2 shows the general relationship between the light source 46 and the prism 21. The particular light source shown comprises a condenser 47 in the form of a concave reflector surrounding a lamp 48. The reflector 47 in this embodiment should direct reflected light rays in steeply converging directions toward the entrance face of the prism, the prism being exposed to the light from the source through a transparent opening 50 in the side of the cassette adjacent the film gate 20. Of course, any other condensing system such as the typical condensing lenses found in many projectors may also be used.

It is to be noted that a portion of the projection optics, namely the prismatic element 21, is actually contained within the film cassette as a permanent part thereof. This prismatic element is brought into direct cooperate relationship with the other projector optics to redirect light from the source 46 through the film and the projection lens 51. Several unique advantages stem from this. In the first place, the cassette assembly may be very simply inserted into a complementary projector mechanism without the necessity of removing a loop of film from the cassette and feeding it through the optical system of the projector. Nor is it necessary for the projector to include a movable mirror assembly to be thrust into an aperture in the cassette during loading operations. Beside simplifying the projector, the permanent prism in the cassette offers other advantages above and beyond those offered by the use of any mirror mechanism. An angularly disposed reflecting surface behind the film gate 20 necessarily places a limit on the proximity between the film gate and the light source of the projector. The larger the distance between the film gate and the condensing system of the projector, the smaller the effective aperture of the light source. By the use of a prism which has an index of refraction very substantially larger than the index of refraction of air, a large numerical aperture of the light source is achieved within a limited space. This results from the fact that the large solid angle of projection light impinging upon the entrance surface of the prism 21 is effectively narrowed and efficiently funneled toward the film positioned in the film gate. A simple reflector cannot do this.

Figure 3:
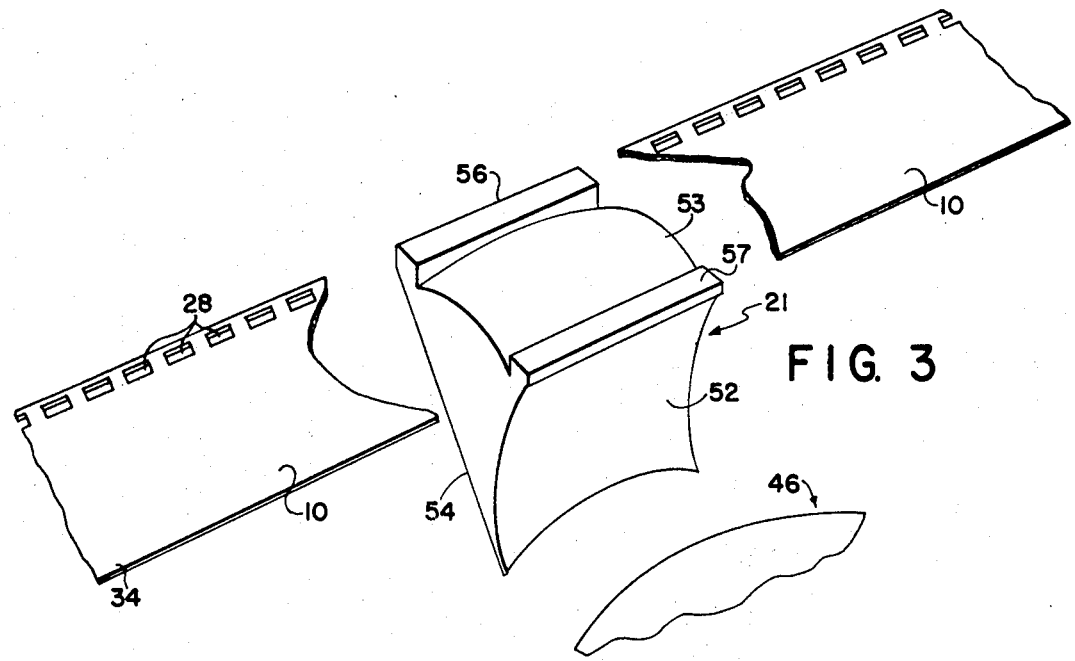
FIG. 3 is a perspective view of a preferred form of prismatic element included within the cassette of FIGS. 1 and 2 and showing the cooperation of this prismatic element with the film and with a portion of the projection optics.

To further improve the light collection efficiency of the prism, the prism is preferably given a configuration such as that shown in FIG. 3. In this figure it can be seen that the prism comprises a concave entrance surface 52 and a convex exit surface 53 immediately adjacent the film plane. The concave entrance surface of the prism acts as a negative lens to accept the sharply converging light rays from the condenser system and refract them more nearly parallel. After the entering light rays are reflected from the reflection surface 54 of the prism, they are directed through the convex surface of the prism from which they emerge once more at steeply converging angles to illuminate the image-bearing film efficiently. The prism is preferably formed of a transparent plastic exhibiting substantial resistance to heat. It is formed with parallel bearing surfaces 56 and 57 on opposite sides of the convex surface 53. During exposure and projection the film strip 10 is guided and confined within the proper film plane within the film gate partly through contact with these bearing surfaces.

When the cassette is introduced into the projector 29 with reels 12 and 14 coupled to appropriate driving means, the baffled orifice 41 is also connected to the duct 42 which delivers air from a heater and blower 60. This forces a stream of warm air through the heater duct 42 through the length of the drying chamber 43 and out through output port 44. The projector mechanism also includes an incremental film advancing mechanism comprising, for example, a reciprocating claw 61 operated in coordination with an intermittent projector shutter not shown in the drawings. Any suitable mechanism for incrementally advancing the film past the film gate and for opening and closing the shutter in coordination therewith may be used. When the film cassette is in the projector and the film is being rewound onto the supply reel, some means should be provided to cover the film gate and its adjacent prism to prevent light from being admitted to the film before the film is developed. If the projector mechanism is light-tight, this may easily be accomplished simply by turning off the projector light source and by keeping the projector shutter closed during this operation. This may be accomplished by an interlock system which prevents the lamp from being lit or the shutter being opened whenever the cassette is being rewound.

Many variations and different embodiments of this invention are possible within the scope of these teachings. For instance, it may be desirable in some instance to utilize a second doctor blade in the cassette for treating the developed film, as it passes from the reel 12 to the drying station 16, with a neutralizing substance or a protective coating. Additionally, although the invention has been described in connection with the use of a film from which the negative need not be removed after development, the invention may also be practiced in connection with a film from which the negative is removed after development. With such a film it would then be necessary to include an additional functional station within the cassette at which the negative is scraped, sponged or otherwise removed from the film although this is not the currently preferred mode of utilization of the present invention.

The incorporation of a permanent prismatic element at the film gate of the cassette makes possible other advantage. For example, a camera constructed to receive a cassette of this type may, with minor modifications, be used not only in the exposure of the film, but also for viewing of the film after it has been fully developed. One way in which this might be accomplished would be to incorporate in the camera a source of light adjacent the entrance surface of the prismatic element. This could be in the form of a normally closed but openable light collecting lens or window, or alternatively, a built-in examination light for directing light into the prism. The camera may then be utilized by the operator to view the developed film directly through the lens of the camera itself. It is well known that a typical motion picture camera lens is far superior to the usual lenses employed for close-range visual inspection of motion picture films.

Since these and other variations of the invention and its modes of utilization may be made within the scope of the present teachings, it is intended that the matter contained in this description should be interpreted as illustrative and not necessarily limiting on the scope of the invention.

What is claimed is:

1. Apparatus for use with a compact multipurpose film handling cassette including a substantially opaque housing configured to be first mounted in a camera to facilitate film exposure operations and then in said apparatus, a strip of motion picture film stored within such housing, a film gate, a normally inoperative film processing station within such housing, and means within such housing responsive to externally mounted drive means for facilitating the progressive transport of such film strip sequentially across such film gate and through such film processing station, said apparatus comprising:
   a housing configured to receive such cassette;
   film image projection means; and
   means for selectively rendering such cassette processing station operable and for driving such film strip transport means of such cassette so that with such cassette mounted in said apparatus such film strip may be processed within such cassette housing and subsequently progressively brought into operative relationship with said film image projection means.

2. The invention of claim 1 wherein such cassette additionally includes a normally inoperative film drying station within its such housing and its such film strip transport means facilitates the progressive transport of such film strip within such housing sequentially across such film gate, through such film processing station and through such drying station and wherein said apparatus additionally includes means for rendering such cassette film drying station operable.

3. The invention of claim 2 wherein said means for rendering such cassette film drying station operable comprises means for directing a flow of air thereinto.

4. Apparatus for use with a compact multipurpose motion picture film handling cassette including a substantially opaque housing configured to be first mounted in a camera to facilitate film exposure operations and then in said apparatus, an exposed unprocessed film strip stored within such housing, a normally inoperative film processing station within such housing, a projection station within such housing and means for facilitating the progressive transport of such film strip within such housing sequentially through such processing station and such projection station, said apparatus comprising:
   a housing adapted to receive such cassette;
   film image projection means positioned to be in operative relationship with such projection station of such cassette when such cassette is received into said apparatus; and
   means for rendering such cassette processing station operable and for driving such film strip transport means of such cassette so that with such cassette mounted in said apparatus such unprocessed film strip may be processed and then such processed film strip projected for viewing purposes without removing it from such cassette.

5. A motion picture film system comprising:
   a film handling cassette including:
      a substantially opaque housing configured to be first mounted in a camera to facilitate film exposure operations and then in a projector;
      a strip of motion picture film stored within said housing;
      a film gate;
      a normally inoperative film processing station within said housing; and
      means within said housing responsive to externally mounted drive means for facilitating the progressive transport of said film strip sequentially across said film gate and through said film processing station; and
   a projector including:
      a housing configured to receive said cassette;
      film image projection means; and
      means for selectively rendering said cassette processing station operable and for driving said film strip transport means of said cassette so that with said cassette mounted in said apparatus said film strip may be processed within said cassette housing and subsequently progressively brought into operative relationship with said film image projection means.

6. A motion picture film handling system comprising:
   a compact multipurpose motion picture film handling cassette including:
      a substantially opaque housing configured to be first mounted in a camera to facilitate film exposure operations and then in a projector;
      an exposed unprocessed film strip stored within said housing;
      a normally inoperative film processing station within said housing;
      a projection station within said housing; and
      means for facilitating the progressive transport of said film strip within said housing sequentially through said processing station and said projection station; and
   a projector including:
      a housing adapted to receive said cassette;
      film image projection means positioned to be in operative relationship with said projection station of said cassette when said cassette is received into said projector; and
      means for rendering said cassette processing station operable and for driving said film strip transport means of said cassette so that with said cassette mounted in said projector said unprocessed film strip may be processed and then said processed film strip projected for viewing purposes without removing it from said cassette.

7. A method for operating a film handling cassette containing a strip of unexposed motion picture film to effect film exposure, processing and viewing without removing the film strip from said cassette, said cassette including a substantially opaque housing configured to be mounted in both a camera and projector, a strip of unexposed motion picture film stored within said housing, a normally inoperative processing station and means for sequentially permitting image-carrying light rays to be directed into said housing and for permitting a beam of light to be directed through said housing, said method comprising the steps of:

directing image-carrying light rays into said housing through said means;

simultaneously progressively transporting the entire length of said unexposed film strip intended to have viewable images recorded thereon across said means to facilitate the exposure of said film strip;

rendering said processing station operable;

progressively transporting at least said length of said exposed film strip through said processing station while light shielding said means to facilitate the development of viewable images thereon;

rendering said processing station inoperable;

directing a beam of light through said means into said housing through an incremental section of said film strip and outwardly of said housing; and progressively transporting at least said length of said film strip across said means to facilitate the viewing of said viewable images.

8. The invention of claim 7 wherein said film strip is transported within said cassette in a first direction during exposure and projection operations and in the opposite direction during processing operations.

9. The invention of claim 7 wherein said film strip is substantially entirely coiled at a first position within said cassette prior to commencement of film exposure operations, substantially entirely coiled at a second position within said cassette upon completion of film exposure operations and substantially entirely coiled within said cassette at said first position upon completion of film processing operations.

10. A method for operating a film handling cassette containing a strip of unexposed motion picture film to effect film exposure, processing and viewing without removing the film strip from said cassette, said cassette including a housing configured to be mounted in both a camera and projector, a strip of unexposed motion picture film stored within said housing, a normally inoperative processing station and means for sequentially permitting image-carrying light rays to be directed onto an incremental section of said film strip and for permitting a beam of light from a projection lamp to be directed through an incremental section of said film strip, said method comprising the steps of:

directing image-carrying light rays towards said means;

simultaneously progressively transporting the entire length of said unexposed film strip intended to have viewable images recorded thereon into operative relationship with said means to facilitate the exposure of said film strip;

rendering said processing station operable;

progressively advancing at least said length of said exposed film strip through said processing station while precluding light from impinging upon any section of said film strip to facilitate the development of viewable images thereon;

rendering said processing station inoperable;

directing a beam of light from a projection lamp into operative relationship with said means; and progressively transporting at least said length of said film strip across said means to facilitate the viewing of said viewable images.

11. The invention of claim 10 wherein said film strip is advanced within said cassette in a first direction during exposure and projection operations and in the opposite direction during processing operations.

* * * * *